United States Patent  [15] 3,658,557
Samejima et al.  [45] Apr. 25, 1972

[54] PROCESS FOR PREPARING COLORING AGENTS FOR FOOD AND BEVERAGES

[72] Inventors: Hirotoshi Samejima; Yuji Nagano; Shigenori Ota, all of Machida-shi; Yasushi Kanzaki; Hideki Matsuo, both of Tokyo; Keizo Kuroda, Kashiwa-shi, all of Japan

[73] Assignee: Kyowa Hakko Kogyo Co., Ltd., Chiyoda-ku, Tokyo, Japan

[22] Filed: Sept. 23, 1969

[21] Appl. No.: 860,437

[30] Foreign Application Priority Data

Sept. 24, 1968  Japan....................................43/68257

[52] U.S. Cl..................................................99/148, 8/94.11
[51] Int. Cl..........................................A23l 1/26, A23l 1/27
[58] Field of Search......................................99/148; 8/94.11

[56] References Cited

UNITED STATES PATENTS 2,021,621  11/1935  Allen et al. ................................99/148
2,784,118  3/1957  Pyle et al. ..................................99/148

OTHER PUBLICATIONS

Chem Absts. " Destruction of Amino Acids by Heating." 13038b Vol. 59, 1963.
Chem Absts. " Maillard' s Reaction I Behavior of Pure Lysine." 13211b Vol. 56, 1963.
Chem Absts. " Browning Reactions of Amino Acid-Sugar Solutions Under Severe Conditions" 14185h Vol. 59, 1963.

Primary Examiner—Raymond N. Jones
Assistant Examiner—J. M. Hunter
Attorney—Craig, Antonelli & Hill

[57] ABSTRACT

A coloring agent for foods and beverages having anti-oxidizing, oxygen-absorbing and lipoxidase-inhibiting properties is prepared by heating an alkaline aqueous mixture of a saccharide and an amino acid to generate the coloring agent, and then dealkalizing the reaction solution by neutralization with an acid or by treatment on an acidic cation exchange resin. The pH of the aqueous mixture must be at least 11, preferably 11 – 13, in order to obtain the desired properties.

14 Claims, No Drawings

PROCESS FOR PREPARING COLORING AGENTS FOR FOOD AND BEVERAGES

This invention relates to coloring agents for foods and beverages. More particularly, it relates to a process for preparing coloring agents for foods and beverage which are capable of preventing quality degradation. Even more particularly, the invention relates to a novel method for preparing coloring agents for foods and beverages simultaneously having anti-oxidizing, oxygen-absorbing and lipoxidase-inhibiting actions.

With the diversity of dietary life in recent years, various processed foods have been introduced into the market place. Along with this development, a means for coloring such foods and a means for preventing the quality degradation thereof have been desired. Accordingly, various artificial coloring agents and quality degradation-preventing agents have been used. However, the use of more natural coloring agents and quality degradation-preventing agents is preferred.

On the other hand, a browning reaction or an aminocarbonyl reaction resulting from the reaction of an amino acid with a saccharide has heretofore been considered as a cause of the discoloration of various foods. A variety of studies have been conducted concerning the site of inhibition of this reaction. More systematic researches have been advanced recently regarding the aminocarbonyl reaction, and importance has been placed on said reaction as a generation source of seasoning flavors for foods. It has also been known that, owing to the browning reaction, there is brought about an anti-oxidizing action, which inhibits the formation of peroxides in foods. In addition to these facts, the present inventors previously found that when an amino acid is reacted with a saccharide under alkaline conditions, a strong oxygen-absorbing capability is developed (Japanese patent application No. 77637/67). The present inventors have further found that the product of the above-mentioned reaction strongly inhibits the action of an oil-oxidizing enzyme (lipoxidase), which is widely present in plant seeds and the like and which tends to become an obstacle in food processing.

Accordingly, one of the objects of the present invention is to provide improved coloring agents for foods and beverages.

Another object of the present invention is to provide coloring agents for foods and beverages which are also capable of preventing a degradation in the quality thereof.

A further object of the invention is to provide a novel method for the preparation of said food and beverage coloring agents.

These and other objects and advantages of the present invention will become apparent to those skilled in the art from a consideration of the following specification and claims.

In accordance with the present invention, it has been found that coloring agents for foods and beverages meeting the above objectives are obtained by heating a mixture of an amino acid and a saccharide under alkaline conditions at pH 11 or above to simultaneously generate a coloring matter together with anti-oxidizing, oxygen-absorbing and lipoxidase-inhibiting actions, and then neutralizing the mixture with an acid or treating the same with a free acid form, weakly acidic cation exchange resin.

This invention results from detailed studies concerning the conditions for the formation of a coloring matter and for the development of the above-mentioned properties desirable for the processing and storage of foods. As a result, the inventors have found that said properties are greatly affected by the pH at the time of the reaction and are strongly developed simultaneously when the reaction mixture is brought to pH 11 or above by means of a caustic alkali and is then heated.

In the first place, the formation of a coloring matter was investigated in such a manner that a solution having, for example, a glycine concentration of 0.5 M and a glucose concentration of 2.0 M was adjusted to pH values ranging from acidic to alkaline by means of hydrochloric acid or caustic soda (sodium hydroxide). The resultant solutions were heat-treated at 100° C. for 30 minutes, and the reaction dopes were diluted to 100 times by the use of a 0.1 N-phosphoric acid buffer solution at pH 7 and were compared in absorbancy (O.D.) at a wavelength of 500 m$\mu$. The results are set forth in Table 1, and it was found that the formation of coloring matter was marked at pH 11 or above.

TABLE 1

Relationship Between pH of Reaction Liquid and Amount of Coloring Matter formed.

| pH of reaction liquid | 13 | 11 | 9 | 7 | 5 | 3 |
|---|---|---|---|---|---|---|
| Absorbancy (O.D.) | 1.03 | 0.72 | 0.11 | 0.001 | 0.001 | 0.001 |

In addition, a liquid, which had been prepared by passing the reaction solution formed by the reaction at pH 13 through a column packed with a weakly acidic carboxylic acid-type cation exchange resin (Amberlite IRC—50) of the H-form to remove the caustic soda and diluting the treated liquid to 400 times, was investigated as to its absorbancy at each wavelength. The results are set forth in Table 2. It was found that the liquid was similar to caramel and, moreover, had a soft color tone.

TABLE 2

Absorbancy at Each Wavelength of Reaction Liquid Neutralization.

| Wavelength of measurement (m$\mu$) | 410 | 430 | 460 | 500 | 560 |
|---|---|---|---|---|---|
| Absorbancy (O.D.) | 0.782 | 0.538 | 0.348 | 0.716 | 0.085 |

The development of anti-oxidizing property measured in terms of peroxide value was also marked when the reaction was effected under alkaline conditions of pH 11 or above. For example, the aforesaid reaction liquids of glycine and glucose at individual pH values were adjusted to pH 7 by means of hydrochloric acid or caustic soda, and each 0.2 ml. portion of these liquids was added to 10 ml. of an emulsion of a 0.1 N-phosphoric acid buffer solution (pH 7) containing sodium linoleate at a concentration of 0.1 M. After allowing the mixtures to stand at 40° C. for 120 hours, the reaction products were measured as to their peroxide value to obtain the results shown in Table 3. It is to be noted that the products charged with the reaction liquids of pH 11 or more have been greatly inhibited in the formation of peroxide.

TABLE 3

Relationship Between pH of Reaction Liquid and Development of Anti-oxidizing Power.

| pH of reaction liquid | 13 | 11 | 9 | 7 | 5 | 3 |
|---|---|---|---|---|---|---|
| Peroxide value (meq./kg.) | 4 | 8 | 25 | 215 | 230 | 248 |

In the third place, the oxygen-absorbing property is also developed markedly in the reaction carried out at pH 11 or above. The oxygen-absorbing capability was measured in accordance with the Warburg pressure detection method in such a manner that 2.5 ml. of a 0.1 N-phosphoric acid buffer solution (pH 7) was added to the main chamber, while 0.5 ml. of a liquid formed by adjusting to pH 7 the aforesaid reaction liquid of glycine and glucose at each pH was added to the side chamber and 0.2 ml. of a 10 percent caustic soda solution was added to the sub-chamber. Shaking was effected at 37° C. for 24 hours in order to measure the amount of oxygen absorbed. The results are shown in Table 4 as the amount of oxygen absorbed per liter of the reaction liquid. It can be seen that the oxygen-absorbing ability is markedly developed when the reaction is carried out at pH 11 or above.

TABLE 4

Relationship Between pH of Reaction Liquid and Development of Oxygen-absorbing Ability.

| pH of reaction liquid | 13 | 11 | 9 | 7 | 5 | 3 |
|---|---|---|---|---|---|---|
| Oxygen absorption amount (mole/l.) | 0.371 | 0.138 | 0.017 | 0 | 0 | 0 |

As a fourth point, the lipoxidase-inhibiting action also is developed strongly when the reaction has been effected on the alkaline side, particularly at pH 11 or above. The lipoxidase activity was measured in terms of the amount of peroxide formed because of enzymatic oxidation of unsaturated fatty acid. This measurement was carried out by means of a procedure wherein 0.2 ml. of a liquid formed by adjusting to pH 7 the reaction liquid of glycine and glucose reacted at each pH and 1 mg. of a standard product of lipoxidase prepared from raw soybeans were added to 10 ml. of the aforesaid emulsion of phosphoric acid buffer solution of sodium linoleate. The mixture was reacted at 37° C. for 15 hours, and then the peroxide value thereof was measured. The results are shown in Table 5.

TABLE 5

Relationship Between pH of Reaction Liquid and Development of Lipoxidase-inhibiting Power.

| pH of reaction liquid | 13 | 11 | 9 | 7 | 5 | 3 | At the time when no reaction product was added. |
|---|---|---|---|---|---|---|---|
| Peroxide value (meq./kg.) | 7 | 13 | 36 | 50 | 53 | 59 | 90. |
| *Peroxide formation amount inhibited by reaction product (meq./kg.) | 83 | 77 | 54 | 40 | 37 | 31 | |

*The peroxide formation amount was calculated as follows: 90-(peroxide value when each reaction liquid was added) (meq./kg.).

NOTE.—Since the reaction time was short, it was tentatively deemed that the value was ascribable to the lipoxidase-inhibiting power, although chemical anti-oxidizing power was also included.

Among the four above-discussed properties, the coloring matter formation is an extremely desirable property from the point of view of a coloring agent for foods or beverages. This is particularly true since the color of said coloring matter is similar to caramel or is somewhat reddish, and the color feeling thereof is soft. Furthermore, the product is stable to acid and does not decolorize or form a precipitate. This point is an extremely desirable property since there are many foods which are generally acidic. Furthermore, caramel has, in general, the property of coagulating or precipitating in the presence of tannic acid, whereas the present reaction product does not form any precipitate at all. In addition, the color matter product of the present invention is highly soluble in alcohol. For example, a dry powder of a liquid, which has been prepared by the dealkalization with an ion exchange resin of the above-mentioned liquid obtained by reacting glycine with glucose at pH 13, is soluble in an amount of 5 percent or more in 65 percent ethanol. Hence, the product finds excellent use as a coloring agent for alcoholic drinks. Furthermore, when treated with a weakly acidic cation exchange resin, the reaction product can be dealkalized without detracting from the color thereof. Accordingly, the application and use of the present product in foods and beverages is quite broad.

The peroxide formation-inhibiting effect (antioxidizing action) possessed by the product prepared in accordance with the present invention prevents the degeneration caused by the oxidation of every food. The lipoxidase-inhibiting effect can be effectively utilized for the processing and storage of lipoxidase-containing foods. Moreover, the oxygen-absorbing power, which is a specific phenomenon, can be utilized for removing oxygen dissolved in foods and beverages, particularly those which have been stored in closed containers, for example, bottled, canned and plastic-packed foods and beverages, or oxygen in air left in vacant spaces thereof. Thus, the degeneration resulting from the presence of oxygen in foods and beverages is effectively prevented by the product of the present invention.

With these facts in mind, it is not surprising that the coloring agent provided by the present invention, with its attendant quality degradation-preventing effects, generally finds a wide scope of uses in refreshing drinks such as colas and the like, alcoholic drinks, bakery foods, soy, bean pastes, preserved foods and various bottled and canned goods.

One of the characteristics of the present invention which becomes apparent in the preparation of the above-mentioned coloring agent for foods and beverages is that the browning reaction, which has heretofore been known as the aminocarbonyl reaction, is used to advantage both in the site of preparation and in the site of application by (1) effecting the reaction at pH 11 or above wherein a coloring matter is easily formed and the above-mentioned various effects of quality degradation-prevention are readily developed, and, after the reaction, (2) lowering the pH by acid neutralization or by an ion exchange resin treatment so as to maintain said properties in a stable manner, thereby enlarging the applicability thereof. In foods the pH is generally acidic or neutral and, therefore, it is difficult to form and develop a coloring matter or the above-mentioned quality degradation-preventing effects therein. According, there is a great significance in the fact that a coloring matter and quality degradation-preventing actions can be separately generated and then the pH adjusted so as to be suitable for foods and beverages, pursuant to the present invention.

Furthermore, when an amino acid and a saccharide are reacted at pH 11 or above, the reaction can be effected at a relatively low temperature (120° C. or below, preferably at about 100° C.), and, hence, great advantages in controlling the reaction and in creating a uniformity of quality are brought about. If the same degree of coloration is desired at a pH below pH 11, an extremely long period of time is required or it is necessary to use an extremely high reaction temperature (for example, above 120° C.). Moreover, an increase in the reaction temperature not only makes controlling the reaction more difficult but also brings about the degradation of product quality because of the formation of a precipitate by polymerization or because of the increases of caramel component.

The starting materials to be employed in the reaction of the present invention are as follows. As the saccharides, there can be used reduced sugars such as glucose, fructose, galactose, ribose, xylose, lactose and the like. It is possible to cause a change in color tone of the products by varying the type of saccharides used. As the amino acids, all of the neutral, acidic and basic amino acids, such as glycine, alanine, glutamic acid, aspartic acid, lysine, ornithine, arginine and the like can be employed. Basic amino acids have a particularly high efficiency for forming coloring material.

The pH of the reaction liquid should be 11 or more, and a pH of about 13 is preferred. If the pH approaches 14, the various advantageous effects of the invention become decreased.

The proportions and concentrations of amino acid and saccharide at the time of reaction can be varied, as occasion demands. However, it is desirable that a ratio by mole of the amino acid to the saccharide at the time reaction is 1:1–5. Particularly, the most effective coloring matter can be obtained at a ratio by mole of the amino acid to the saccharide of 1:4.

The reaction is carried out at a temperature of about 120° C. or below, and the reaction proceeds satisfactorily at about 100° C. Accordingly, a specific pressure reactor is not required, and there is little or no danger of obtaining a non-uniform product quality due to roasting. The reaction is generally carried out for about 10 minutes to about 3 hours at about 100° C., although the exact time of reaction is, of course, dependent upon the temperature.

The caustic alkali employed for alkalizing the reaction liquid is preferably sodium hydroxide (caustic soda), potassium hydroxide (caustic potash) or sodium carbonate. The acid employed for the acid-neutralization step after the reaction is advantageously an inorganic acid such as hydrochloric acid, phosphoric acid or the like, an organic acid such as acetic acid, citric acid, malic acid or the like or an acidic amino acid of the free acid form such as glutamic acid, aspartic acid or the like. The particular acid used, however, may be suitably selected or may be used in combination according to the particular kind of food or beverage to be colored.

In order to remove alkali from the reaction liquid, the liquid is treated by a batch process or a column process with an acrylic acid-type weakly acidic cation exchange resin (for example, Amberlite IRC—50, Rohm & Haas Co., USA), which has previously been brought into the H-form by treatment with the mineral acid, whereby excess alkali can be adsorbed and removed. This treatment does not destroy the coloring matter or its various quality degradation-preventing properties. In fact, this is one of the characteristics of the present invention. Furthermore, the ion exchange treatment and the aforesaid acid neutralization may be adopted in combination, as the situation demands.

The reaction liquid, which has been subjected to acid neuteralization or ion exchange treatment, may be added to foods or beverages as such. Alternatively, the liquid may be stored and used after forming a concentrate thereof by vacuum concentration or by reduced pressure concentration in a nitrogen current, or by forming it into a solid by vacuum-drying, freeze-drying or spray-drying.

The following examples are given merely as illustrative of the present invention and are not to be considered as limiting. Unless otherwise noted, the percentages therein and throughout the application are by weight.

EXAMPLE 1

56.3 g. of glycine and 540 g. of glucose are dissolved in water, and the solution is adjusted to pH 13 by means of caustic soda. Thereafter, the solution is charged with water to make a total volume of 1.5 liters and is heated at 100° C. for 30 minutes. After cooling, the reaction solution is passed at a suitable rate through a resin column packed with 3 liters of the weakly acidic cation exchange resin, Amberlite IRC—50, which has previously been brought into the H-form by treatment with a dilute acid. The colored portions are eluted with water. The colored effluents collected from the column are concentrated to a volume of about 1 liter and are then freeze-dried to give 483 grams of a coloring agent solid having antioxidizing, oxygen-absorbing and lipoxidase-inhibiting actions.

EXAMPLE 2

73 g. of L-lysine hydrochloride and 360 g. of fructose are dissolved in water, and the solution is adjusted to a pH of 13 by means of caustic soda. Thereafter, the solution is charged with water to make a volume of 1 liter, is heated at 100° C. for 20 minutes and is then cooled. The reaction solution is passed through a column packed with 2 liters of Amberlite IRC—50 (H-form). The colored portions are eluted with water, and the obtained colored effluents are concentrated under reduced pressure to obtain 460 ml. of a coloring agent concentrate.

EXAMPLE 3

45 g. of DL-alanine and 360 g. of fructose are dissolved in water, and the solution is adjusted to pH 13. The solution is charged with water to make up a volume of 1 liter and is then heated at 100° C. for 1 hour. The reaction liquid is cooled and is then passed through a column packed with 2 liters of Amberlite IRC—50 (H-form). The colored portions are eluted with water, and the obtained colored effluents are concentrated under reduced pressure to obtain 600 ml. of a coloring agent concentrate.

EXAMPLE 4

93 g. of sodium L-glutamate crystals and 360 g. of glucose are dissolved in water, and the solution is adjusted to pH 13 by means of caustic soda. Thereafter, the solution is charged with water to make up a volume of 1 liter and is heated at 100° C. for 1 hour. After cooling, the reaction liquid is neutralized to pH 7.0 with 6 N-hydrochloric acid and is concentrated under reduced pressure to obtain 600 ml. of a coloring concentrate.

EXAMPLE 5

2.7 kg. of sugar, 1.9 liters of water, 9 ml. of phosphoric acid syrup, 3.75 g. of caffeine, 4.5 ml. of coca leaf lixiviate, 7.5 ml. of cola seed extract, 47 ml. of alcohol, 15 ml. of vanilla extract, 12 ml. of glycerine, 48 liters of lime juice and 12 ml. of an adjuvant flavor comprising lemon oil, orange oil, nutmeg oil, cinnamon oil and alcohol are mixed together. Then, 150 grams of the coloring agent obtained in Example 1 is added to the mixture and is mixed to obtain a cola syrup. 40 g. of this syrup is introduced into a 250 ml. pressure bottle, and the bottle is filled with carbonic acid water and is stoppered to obtain a cola drink having a desirable color.

EXAMPLE 6

10 ml. of the coloring agent obtained in Example 2 is added to a mixture comprising 870 g. of whole milk, 550 g. of skim milk, 120 g. of sugar and 250 ml. of coffee lixiviate. The mixture is further charged with water to make up a volume of 1.8 liters and is heated and dissolved to obtain a coffee milk having a desirable color tone.

EXAMPLE 7

10 ml. of the coloring material obtained in Example 3 is added to 100 ml. of a whisky malt liquor, and the mixture is charged with water to a volume of 2 liters. An alcoholic drink imparting the same color feeling as normal whisky is obtained.

EXAMPLE 8

30 ml. of the coloring agent obtained in Example 4 is added to a mixture comprising 30 g. of sodium L- glutamate crystals, 300 g. of sodium chloride, 3 g. of sodium inosinate, 5 g. of sodium aspartate, 10 g. of DL-alanine and 100 ml. of commercially available sweet sake. The mixture is heated and dissolved and is charged with water to make up a volume of 1 liter. A seasoning liquid having a color feeling of soy is obtained.

The invention being thus described, it will be obvious that the same may be varied in many ways. Such variations are not to be regarded as a departure from the spirit and scope of the invention, and all such modifications as would be obvious to one skilled in the art are intended to be included herein.

What we claim is:

1. A process for the preparation of a coloring agent for foods and beverages, said coloring agent having anti-oxidizing, oxygen-absorbing and lipoxidase-inhibiting properties, which comprises heating at a temperature of about 100° to 120° C. and thereby reacting an aqueous mixture of a saccharide selected from the group consisting of glucose, fructose, galactose, ribose, xylose and lactose and an amino acid, the ratio by mole of the amino acid to the saccharide at the time of reaction being 1:1–5, said aqueous mixture having a pH of 11 or above, to generate said coloring agent, and then dealkalizing the resultant reaction solution by neutralization with an acid or by treatment with a weakly acidic cation exchange resin in the free acid form.

2. The process of claim 1, wherein said amino acid is a basic amino acid.

3. The process of claim 1, wherein said amino acid is selected from the group consisting of glycine, alanine, glutamic acid, aspartic acid, lysine, ornithine and arginine.

4. The process of claim 1, wherein the pH of said aqueous mixture is about 11 to 13.

5. The process of claim 1, wherein a caustic alkali selected from the group consisting of sodium hydroxide, potassium hydroxide and sodium carbonate is used to adjust the pH of said aqueous mixture.

6. The process of claim 1, further comprising the step of concentrating the obtained product under a vacuum to give a concentrate thereof.

7. The process of claim 1, further comprising the step of drying the obtained product by vacuum-drying, freeze-drying or spray-drying to give a solid coloring agent.

8. A coloring agent for foods and beverages produced by the process of claim 1.

9. A process for the preparation of a coloring agent for foods and beverages, said coloring agent having anti-oxidizing, oxygen-absorbing and lipoxidase-inhibiting properties, which comprises heating an aqueous mixture of glucose or fructose and an amino acid in an amount sufficient to produce the desired color selected from the group consisting of glycine, lysine, alanine, glutamic acid and sodium and potassium salts thereof at a temperature of about 100° to 120° C., a said aqueous mixture having a pH of about 11 to 13, to generate said coloring agent, and then dealkalizing the resultant reaction solution by neutralization with an acid or by treatment with a weakly acidic cation exchange resin in the free acid form.

10. The process of claim 9, wherein a caustic alkali selected from the group consisting of sodium hydroxide, potassium hydroxide and sodium carbonate is used to adjust the pH of said aqueous mixture.

11. A process for coloring foods and beverages which comprises forming a food or a beverage coloring agent having anti-oxidizing, oxygen-absorbing and lipoxidase-inhibiting properties by heating at a temperature of about 100° to 120° C. and thereby reacting an aqueous mixture of a saccharide selected from the group consisting of glucose, fructose, galactose, ribose, xylose and lactose and an amino acid, the ratio by mole of the amino acid to the saccharide at the time of reaction being 1:1–5, said aqueous mixture having a pH of 11 or above, to generate said coloring agent, then dealkalizing the resultant reaction solution by neutralization with an acid or by treatment with a weakly acidic cation exchange resin in the free acid form and adding the dealkalized solution to the foods or beverages.

12. The process of claim 11, wherein said amino acid is selected from the group consisting of glycine, alanine, glutamic acid, aspartic acid, lysine, ornithine and arginine.

13. A process for coloring foods and beverages which comprises forming a food or a beverage coloring agent having anti-oxidizing, oxygen-absorbing and lipoxidase-inhibiting properties by heating an aqueous mixture of glucose or fructose and an amino acid in an amount sufficient to produce the desired color selected from the group consisting of glycine, lysine, alanine, glutamic acid and sodium and potassium salts thereof at a temperature of about 100° to 120° C., said aqueous mixture having a pH of about 11 to 13, to generate said coloring agent, then dealkalizing the resultant reaction solution by neutralization with an acid or by treatment with a weakly acidic cation exchange resin in the free acid form and adding the dealkalized solution to the foods or beverages.

14. A process for the preparation of a coloring agent for foods and beverages, said coloring agent having anti-oxidizing, oxygen-absorbing and lipoxidase-inhibiting properties, which comprises heating at a relatively low temperature and thereby reacting an aqueous mixture of a reducing saccharide and an amino acid in an amount sufficient to produce the desired color, said aqueous mixture having a pH of 11 or above, to generate said coloring agent, and then dealkalizing the resultant reaction solution by neutralizing with an acid or by treatment with a weakly acid cation exchange resin in the free acid form.

* * * * *